US006965447B2

(12) United States Patent
Satake et al.

(10) Patent No.: US 6,965,447 B2
(45) Date of Patent: Nov. 15, 2005

(54) METHOD FOR PRODUCING A PRINT HAVING A VISUAL IMAGE AND SPECIFIC PRINTED INFORMATION

(75) Inventors: Wataru Satake, Tokyo (JP); Toru Kawabe, Tokyo (JP); Hiroshi Yamashita, Tokyo (JP); Koji Takemura, Tokyo (JP)

(73) Assignee: Konica Corporation, Tokyo (JP)

( * ) Notice: Subject to any disclaimer, the term of this patent is extended or adjusted under 35 U.S.C. 154(b) by 860 days.

(21) Appl. No.: 09/842,341

(22) Filed: Apr. 25, 2001

(65) Prior Publication Data

US 2001/0052997 A1 Dec. 20, 2001

(30) Foreign Application Priority Data

May 8, 2000 (JP) ....................................... 2000-134415
Jun. 14, 2000 (JP) ....................................... 2000-178155

(51) Int. Cl.[7] .......................... G06F 13/00; G06K 15/02
(52) U.S. Cl. ..................... 358/1.15; 358/1.14; 358/1.13
(58) Field of Search ................................ 358/1.1–1.18, 358/2.1, 3.26, 452, 537

(56) References Cited

U.S. PATENT DOCUMENTS 6,655,284 B1 * 12/2003 Hoshii et al. ............... 101/484
6,747,752 B1 * 6/2004 Farago ...................... 358/1.15

* cited by examiner

*Primary Examiner*—Douglas Tran
(74) *Attorney, Agent, or Firm*—Frishauf, Holtz, Goodman & Chick, P.C.

(57) ABSTRACT

The present invention concerns a method for producing prints, on which a specific image is printed based on a specific information set when a captured image is printed as a visible image on the print, based on image data of the captured image. The method includes the steps of: reading a plurality of specific information sets and a plurality of associate information sets, both of which are stored in a server, installed on a network, in such a manner that each of the specific information sets relates to each of the associate information sets in regard to a date and time and/or each of the associate information sets for identifying or classifying the specific information sets; selecting a part of specific information sets out of a plurality of the specific information sets read from the server, based on the associate information sets; and printing the specific image, based on the specific information set, on the print on which the captured image is also printed.

5 Claims, 9 Drawing Sheets

314

| | CONTENTS OF ADVERTISEMENT | DISCOUNT RATE |
|---|---|---|
| A | KONICA CAMERA SHOP | - 10 |
| B | ELECTRONIC-APPLIANCE SHOP | - 15 |
| C |  COOKIE SHOP | - 20 |
| | . . . | |

METHOD FOR PRODUCING A PRINT HAVING A VISUAL IMAGE AND SPECIFIC PRINTED INFORMATION

BACKGROUND OF THE INVENTION

The present invention relates to a print-outputting method and a print-outputting system, which make it possible to give a additive value to a print.

Conventionally, laboratories, etc. have conducted a print service for providing prints on which images, captured by the customer and exposed onto a silver-halide negative film, are printed. Further, corresponding to the rapid development of the digital still cameras associating with the improvement of digital technologies developed in recent years, laboratories, etc. have also conducted a print service for printing images based on the image data provided by the customer.

In the abovementioned field of service, a print service for providing postcards, such as New Year greeting cards, etc., being photographic papers on which an image captured by the customer and letters of, for instance, "A Happy New Year" and associated images are printed, has been already put into practice. There has been a problem, however, that, as for the postcards provided by the above print service, the customer can only select one of readymade template images issued by the manufacturer.

On the other hand, the recent popularization of the digital printers has made it possible to provide a print service for freely synthesizing images with letters and illustrations designated by the customer to outputs desirable prints. However, the customer needs specialized software to modify the image data to be printed and a proficiency in its modification in a certain extent. Conversely, it has been difficult for a store, running a business of print service, to modify the image data corresponding to the demands of the customers, due to a limitation of its capability, namely, the actual situation of such a store is that it is possible to cope with a case of outputting tens of prints having the same image, such as name-cards with a portrait of the customer, but, it is not suitable to synthesize letters and illustrations being different one by one in each print.

In the abovementioned field of service, it may be possible to provide a print service for displaying advertising messages and guiding information on a part of photographic paper, serving as an image-forming medium, on which images are printed, in order to obtain a part of the printing cost from a sponsor, being a subject of displaying the advertising messages and guiding information. In the abovementioned print service, it is a merit for the sponsor to widely advertise information of the products manufactured by the sponsor himself, while it is a merit for the customer to make the printing charge cheaper. Further, it is a merit for laboratories, etc. to increase profits by increasing a number of customers using the printing service.

In the abovementioned print service, although it is desirable that images based on image data captured by the customer and images based on additive information added by the sponsor are printed on the same photographic paper to improve advertising effects, it is a problem to determine a layout of arranging those images on the same photographic paper. Namely, the conventional L size of the prints is 89 mm×127 mm. Accordingly, in order to produce the L size prints without any loss, either a roll photographic-paper having a width of 89 mm should be cut at every length of 127 mm or a roll photographic-paper having a width of 127 mm should be cut at every length of 89 mm.

Accordingly, since, in the conventional print producing method, all of the width of the roll photographic-paper is fully utilized for printing images regardless of bordered or borderless prints, it has been a problem that the size of the captured image decreases when the images based on the additive information are arranged in the width direction of the photographic paper in parallel. To overcome the abovementioned problem, it may be applicable to employ a photographic paper having a larger width for forming the images based on the additive information. However, this would cause an increase of cost and arise another problem that it is necessary to modify the image-forming apparatus.

Further, it is quite natural that the sponsor, who intends to print images for advertising purpose, wishes that the images based on the additive information appeal to the viewer of viewing images based on the captured image information as stronger as possible. Therefore, it is an important problem to determine a color and a layout of the images based on the additive information. In addition, some sponsors, in a certain field of business, wish to widely distribute coupon tickets and/or discount tickets.

SUMMARY OF THE INVENTION

To overcome the abovementioned drawbacks in conventional image-forming apparatus, it is the first object of the present invention to provide a print-producing method and a print-outputting system, which make it possible to provide a print-service having a higher added value with simple operations, by printing enjoyable factors other than images captured by the customer on the prints.

Further, the second object of the present invention is to provide a printing system, a printing method and print-forming apparatus, which make it possible to effectively utilize image-forming media and to form images having a high appealing capability.

Accordingly, to overcome the cited shortcomings, the abovementioned objects of the present invention can be attained by methods described as follow.

(1) A method for producing a print, on which a specific image is printed based on a specific information set when a captured image is printed as a visible image on the print based on image data of the captured image, comprising the steps of: reading a plurality of specific information sets and a plurality of associate information sets, both of which are stored in a server, installed on a network, in such a manner that each of the specific information sets corresponds to each of the associate information sets in regard to a date and time and for identifying or classifying the specific information sets; selecting a part of specific information sets out of a plurality of the specific information sets read from the server, based on the associate information sets; and printing the specific image, based on the specific information set, on the print on which the captured image is also printed.

(2) The method of item 1, wherein the specific information sets are transferred to a printer from the server and stored in a memory section provided in the printer.

(3) The method of item 1, wherein the reading step is performed at constant time intervals.

(4) The method of item 1, wherein the specific image is printed as a visible image on the print, based on the specific information set.

(5) The method of item 1, wherein, in the selecting step, a kind of the specific information set is selected corresponding to customer's information accumulated in advance in either the printer or the network.

(6) A method for producing a print, on which a specific image is printed based on a specific information set when an image captured by a customer is printed as a visible image on the print based on image data of the image captured by the customer in a shop running a business of producing the print, comprising the steps of: extracting the specific information set from a memory section, in which a plurality of specific information sets are stored, irrespective of the image captured by the customer; and printing the specific image, based on the specific information set extracted in the extracting step, on the print on which the image captured by the customer is also printed, wherein specific images printed on consecutive prints are different relative to each other.

(7) The method of item 6, wherein a plurality of the specific information sets are stored in the memory section in such a manner that a priority degree or an order of each of the specific information sets is determined in advance.

(8) The method of item 6, wherein the memory section is provided in a server installed on a network.

(9) The method of item 6, wherein the specific image is printed as a visible image on the print, based on the specific information set.

(10) The method of item 6, wherein, the specific information set is extracted corresponding to customer's information accumulated in advance.

(11) A method for producing a print, on which a specific image is printed based on a specific information set when an image captured by a customer is printed as a visible image on the print based on image data of the image captured by the customer in a shop running a business of producing the print, comprising the steps of: generating a random number; extracting the specific information set from a memory section, in which a plurality of specific information sets are stored, based on the random number and irrespective of the image captured by the customer; and printing the specific image, based on the specific information set extracted in the extracting step, on the print on which the image captured by the customer is also printed, wherein specific images printed on consecutive prints are different relative to each other.

(12) The method of item 11, wherein the random number is generated in the memory section.

(13) The method of item 11, wherein the specific image is printed as a visible image on the print, based on the specific information set.

(14) The method of item 11, wherein a kind of the specific information sets is selected corresponding to customer's information accumulated in advance.

Further, to overcome the abovementioned problems, other print-outputting methods and print-outputting systems, embodied in the present invention, will be described as follow:

(15) A print-outputting method, characterized in that, the print-outputting method, in which a print is outputted after writing a specific information on the print when image data of a captured subject are print-outputted as a visible image on a print, comprises the steps of:

storing at least associate information, in regard to a date and time and for identifying or classifying specific information, into a server, corresponding to the specific information;

reading a plurality of specific information and a plurality of associate information, stored in the server by means of a computer coupled to a printer;

selecting a part of the specific information out of a plurality of the specific information read from the server, based on the associate information; and writing the specific information on the same print as that of captured image.

(16) A print-outputting method, characterized in that, the print-outputting method, in which a print is outputted after writing a specific information on the print when image data of a captured subject are print-outputted as a visible image on a print in a shop running a print-outputting business of captured images, comprises the steps of:

storing a plurality of information in a computer in advance in such a manner that a priority degree or an order of each of the specific information is determined in advance;

extracting the specific information irrespective of the captured image of a customer based on the priority degree or the order; and writing the specific information, which are different relative to each other on consecutive prints, on the same print as that of captured image.

(17) A print-outputting method, characterized in that, the print-outputting method, in which a print is outputted after writing a specific information on the print when image data of a captured subject are print-outputted as a visible image on a print in a shop running a print-outputting business of captured images, comprises the steps of:

storing a plurality of information in a computer in advance;

extracting the specific information irrespective of the captured image of a customer by generating a random number in the computer;

writing the specific information, which are different relative to each other on consecutive prints, on the same print as that of captured image.

(18) A print-outputting system, characterized in that, the print-outputting system, in which a print is outputted after writing a specific information on the print when image data of a captured subject are print-outputted as a visible image on a print, comprises:

a server to store at least associate information, in regard to a date and time and for identifying or classifying specific information, corresponding to the specific information;

a terminal device, comprising an inputting device, coupled to the server through a network, to select a kind of the specific information, and a selecting device to select the specific information stored in the server, based on the information inputted by the inputting device and referring to the associate information; and a writing device to write the specific information on the same print as that of captured image.

(19) A print-outputting system, characterized in that, the print-outputting system, in which a print is outputted after writing a specific information on the print when image data of a captured subject are print-outputted as a visible image on a print, comprises:

a memory device to store a plurality of information corresponding to a priority degree or an order of each of the specific information;

an extracting device to automatically extract the specific information irrespective of the captured image of a customer based on the priority degree or the order; and a writing device to write the specific information, which are different relative to each other on consecutive prints, on the same print as that of the captured image.

(20) A print-outputting system, characterized in that, the print-outputting system, in which a print is outputted after writing a specific information on the print when image data of a captured subject are print-outputted as a visible image on a print, comprises:

a memory device to store a plurality of the specific information;

an extracting device to automatically extract the specific information, which are different relative to each other on consecutive prints, irrespective of the captured image of a customer by generating a random number in the computer;

a writing device to write the specific information, which are different relative to each other on consecutive prints, on the same print as that of captured image.

The print-outputting method of item 15, in which a print is outputted after writing a specific information on the print when image data of a captured subject are print-outputted as a visible image on a print, comprises the steps of: storing at least associate information, in regard to a date and time and for identifying or classifying specific information, into a server, corresponding to the specific information; reading a plurality of specific information and a plurality of associate information, stored in the server by means of a computer coupled to a printer; selecting a part of the specific information out of a plurality of the specific information read from the server, based on the associate information; and writing the specific information on the same print as that of captured image.

According to the print-outputting method of item 15, it is possible that a plurality of specific information are stored in the server in advance, and the specific information are read into the computer installed in the printer through the network (including Internet), and an arbitral information selected out of a plurality of obtained information are written onto the print, when printing a photographic image. At this time, it is desirable that at least associate information, in regard to a date and time and for identifying or classifying specific information, are stored into the server, corresponding to the specific information, and the specific information are read with the associate information when reading them into the computer of the printer side, and the associate information are extracted for selecting information to be written on the print. The associate information in regard to its date and time may be utilized as an indicator of information newness, and the associate information for identifying or classifying purpose can be utilized for selecting the information from the customer's favorite field. It is a merit of supplying specific information through the network that a larger amount of information can be delivered to a plurality of stores. In a mode that each of the stores accesses an information-storing site provided in the server by the dealer, it is possible for each of the stores to automatically obtain a lot of information without making efforts for collecting information by themselves. It is desirable that the information-providing dealer revises the information stored in the server at every predetermined period of time so that each of stores can record the newest daily information onto the prints by accessing the information-storing site every day to store the information in the computer of the store. Incidentally, the term of "the computer coupled to the printer" includes a meaning of "a computer incorporated in the printer".

The print-outputting method of item 16, in which a print is outputted after writing a specific information on the print when image data of a captured subject are print-outputted as a visible image on a print in a shop running a print-outputting business of captured images, comprises the steps of: storing a plurality of information in a computer in advance in such a manner that a priority degree or an order of each of the specific information is determined in advance; extracting the specific information irrespective of the captured image of a customer based on the priority degree or the order; and writing the specific information, which are different relative to each other on consecutive prints, on the same print as that of captured image.

According to the print-outputting method of item 16, since a plurality of information are stored in a computer in such a manner that a priority degree or an order of each of the specific information is determined in advance and the information are written on the print based on the priority degree or the order, it is possible to write the information in a favorite order. When reading the specific information through the network, it is possible to set the priority degree or the order in the server storing the specific information in advance, or it is also possible to set them after reading the information into the computer of the printer from the server. When a customer orders a plurality of prints, since it is possible to write information into the prints in accordance with the priority degree or the order so that different information are written onto the consecutive prints, it becomes desirably possible to provide a wide range of information, especially in case that the specific information are advertising information, etc. Incidentally, the store, running a print-outputting business of captured images, indicates, for instance, a shop like a photographic laboratory.

As an example of determining such the priority or the order, a case, in which twenty specific information are printed, will be detailed in the following. For this purpose, either method (M1) for one-directionally selecting information without identifying a pause of the customers, or method (M2) for selecting information by returning the information to the priority 1 at every pause of the customer, can be arbitrarily selected. Now, assuming that customer A orders eight prints, customer B orders six prints, customer C orders eight prints and customer D orders six prints, each of customers A, B, C, D receives finished prints on which the specific information as shown in the following numbers are printed.

| | | | | | | | | | |
|---|---|---|---|---|---|---|---|---|---|
| (M1) | customer A | 1 | 2 | 3 | 4 | 5 | 6 | 7 | 8 |
| | customer B | 9 | 10 | 11 | 12 | 13 | 14 | | |
| | customer C | 15 | 16 | 17 | 18 | 19 | 20 | 1 | 2 |
| | customer D | 3 | 4 | 5 | 6 | 7 | 8 | | |
| (M2) | customer A | 1 | 2 | 3 | 4 | 5 | 6 | 7 | 8 |
| | customer B | 1 | 2 | 3 | 4 | 5 | 6 | | |
| | customer C | 1 | 2 | 3 | 4 | 5 | 6 | 7 | 8 |
| | customer D | 1 | 2 | 3 | 4 | 5 | 6 | | |

According to method (M1), it becomes effectively possible to thoroughly print all of the specific information, while according to method (M2), there is a merit that the frequency of printing the specific information having the high priority of the high order will be raised. Accordingly, when the specific information is advertisements etc., the higher the priority or the order of the specific information, the higher the appealing capability of them can be raised. Accordingly, it becomes possible to collect a lager amount of advertising fees.

Incidentally, when determining the priority degree or the order, although it is applicable that the operator manually inputs the priority degree, etc., it is also possible that the priority degrees, etc. are automatically determined, for instance, corresponding to fluctuation in advertising fees, by performing a predetermined program in the computer.

The print-outputting method of item 17, in which a print is outputted after writing a specific information on the print when image data of a captured subject are print-outputted as a visible image on a print in a shop running a print-outputting business of captured images, comprises the steps of: storing a plurality of information in a computer in advance; extracting the specific information irrespective of the captured image of a customer by generating a random number in the computer; writing the specific information, which are different relative to each other on consecutive prints, on the same print as that of captured image.

According to the print-outputting method of item 17, a plurality of specific information, such as advertisements, etc., are stored in the computer in advance, and, when a customer orders a plurality of prints, it is possible to unintentionally write information on the prints, by automatically extracting the information irrespective of the captured image of a customer based on the random number generated in the computer so that advertisements, being different each other, are recorded onto the consecutive prints. Alternatively, it is also possible to write information on the prints by unintentionally extracting the information in order of the recognizing order (for instance, a numerical order, an alphabetical order, etc.) of the computer based on the unintentional associate information, which is added to the specific information, when the specific information are stored in the computer.

To select the specific kind of information corresponding to the customer's taste, it is desirable that information of the customer, including sex, age, interests, etc., are investigated and stored in advance by hearing from the customer, so as to reflect such information onto the operation for selecting the specific kind of information to be recorded on the prints. Further, it is also possible that information, in respect to the kind of images captured by the customer, are accumulated in advance, so as to reflect such information onto the operation for selecting the specific kind of information to be recorded on the prints.

Further, it is desirable that the specific information to be written on the prints are visible information.

Still further, it is desirable that the kind of the specific information to be written on the prints is selected corresponding to customer's information accumulated in advance.

The print-outputting system of item 18, characterized in that the print-outputting system, in which a print is outputted after writing a specific information on the print when image data of a captured subject are print-outputted as a visible image on a print, comprises: a server to store at least associate information, in regard to a date and time and for identifying or classifying specific information, corresponding to the specific information; a terminal device, comprising an inputting device, coupled to the server through a network, to select a kind of the specific information, and a selecting device to select the specific information stored in the server, based on the information inputted by the inputting device and referring to the associate information; and a writing device to write the specific information on the same print as that of captured image.

According to the print-outputting system of item 18, a plurality of specific information are stored in the server in advance, and it is possible to write the information on the prints when printing photographic images, by reading the specific information into the terminal device through the network (including an Internet) and by selecting arbitral information out of a plurality of information obtained. At this time, at least associate information, in regard to a date and time and for identifying or classifying specific information are stored in the server corresponding to the specific information, and, when reading into the terminal device, the specific information are read with the associate information, and it is desirable that the associate information is extracted for selecting the information to be written on the prints. The associate information in regard to its date and time may be utilized as an indicator of information newness, and the associate information for identifying or classifying purpose can be utilized for selecting the information from the customer's favorite field. It is a merit of supplying specific information through the network that a larger amount of information can be delivered to a plurality of stores. In a mode that each of the stores accesses an information-storing site provided in the server by the dealer, it is possible for each of the stores to automatically obtain a lot of information without making efforts for collecting information by themselves. It is desirable that the information-providing dealer revises the information stored in the server at every predetermined period of time so that each of stores can record the newest daily information onto the prints by accessing the information-storing site every day to store the information in the computer of the store.

The print-outputting system of item 19, characterized in that the print-outputting system, in which a print is outputted after writing a specific information on the print when image data of a captured subject are print-outputted as a visible image on a print, comprises: a memory device to store a plurality of information corresponding to a priority degree or an order of each of the specific information; an extracting device to automatically extract the specific information irrespective of the captured image of a customer based on the priority degree or the order; and a writing device to write the specific information, which are different relative to each other on consecutive prints, on the same print as that of the captured image.

According to the print-outputting system of item 19, since a plurality of information are stored in a computer in such a manner that a priority degree or an order of each of the specific information is determined in advance and the information are written on the print based on the priority degree or the order, it is possible to write the information in a favorite order. When reading the specific information through the network, it is possible to set the priority degree or the order in the server storing the specific information in advance, or it is also possible to set them after reading the information into the terminal device from the server. When a customer orders a plurality of prints, since it is possible to write information into the prints in accordance with the priority degree or the order so that different information are written onto the consecutive prints, it becomes desirably possible to provide a wide range of information, especially in case that the specific information are advertising information, etc.

The print-outputting system of item 20, characterized in that the print-outputting system, in which a print is outputted after writing a specific information on the print when image data of a captured subject are print-outputted as a visible image on a print, comprises: a memory device to store a plurality of the specific information; an extracting device to automatically extract the specific information, which are different relative to each other on consecutive prints, irrespective of the captured image of a customer by generating a random number in the computer; a writing device to write the specific information, which are different relative to each other on consecutive prints, on the same print as that of captured image.

According to the print-outputting system of item 20, a plurality of specific information, such as advertisements, etc., are stored in the computer in advance, and, when a customer orders a plurality of prints, it is possible to unintentionally write information on the prints, by automatically extracting the information irrespective of the captured image of a customer based on the random number generated in the computer so that advertisements, being different each other, are recorded onto the consecutive prints. Alternatively, it is also possible to write information on the prints by unintentionally extracting the information in order of the recognizing order (for instance, a numerical order, an alphabetical order, etc.) of the computer based on the unintentional associate information, which is added to the specific information, when the specific information are stored in the computer.

Further, it is desirable that the print-outputting system of item 20 further comprises a writing device for visibly writing the specific information on the prints.

Still further, it is desirable that the print-outputting system of item 20 further comprises a memory device for classifying and accumulating customer's information; and a selecting device for selecting the kind of the specific information to be written on the prints corresponding to the customer's information accumulated by the memory device.

Incidentally, news, weather forecasts, ranking information, good seller information, event information, sightseeing guide information, new product information, recruiting information, advertisements, coupon tickets, lottery tickets, fortune-telling information, illustrations, etc. can be cited as the specific information to be formed on the prints. Although the abovementioned information could be either a visible information such as a row of letters, a table, etc. or invisible information requiring a specific reading apparatus to read it, it is more desirable that the abovementioned information are visible information.

Further, it is possible to arbitrarily set the writing position of the specific information at an upper, a lower, a left or a right position of the captured image, or by overlapping with the captured image.

(21) A printing system, characterized in that, the printing system, for forming an image, based on captured image information and specific information, on anyone of a plurality of image-forming media having different widths and a long-extension in a longitudinal direction in respect to an axial direction, comprises:

a detector to detect a width of the image-forming medium, on which the image is formed;

an obtaining device to obtain a size of the image to be formed; and a determining device to determine at least one of a size, a shape and a forming position of the image based on the specific information in respect to the image based on the captured image information, based on the width detected by the detector and the size of the image obtained by the obtaining device.

(22) A printing system, characterized in that, the printing system, for forming an image, based on captured image information and specific information, on the same image-forming medium, comprises:

a detector to detect a top and bottom direction of the image to be formed based on the captured image information; and a determining device to determine a direction of the image to be formed based on the specific information so as to correspond to a top and bottom direction of the image to be formed based on the captured image information.

(23) A printing system, characterized in that, the printing system, for forming an image, based on captured image information and specific information, on the same image-forming medium, comprises:

a detector to detect a background color of the image to be formed based on the captured image information; and a determining device to determine a background color of the image to be formed based on the specific information, corresponding to the background color detected by the detector.

(24) A printing system, characterized in that, the printing system, for forming an image, based on captured image information and specific information, on the same image-forming medium, comprises:

a detector to detect a color of the image to be formed based on the captured image information and being located near the image based on the specific information; and a determining device to determine a background color of the image to be formed based on the specific information, corresponding to the color of the image detected by the detector.

(25) A printing method, characterized in that, the printing method, for forming an image, based on captured image information and specific information, on anyone of a plurality of image-forming media having different widths and a long-extension in a longitudinal direction in respect to an axial direction, comprises the step of:

disposing the image based on the specific information at a position between images, based on the captured image information, aligned in the longitudinal direction of the image-forming medium.

(26) A printing method, characterized in that, the printing method, for forming an image, based on captured image information and specific information, on the same image-forming medium, comprises the steps of:

detecting a top and bottom direction of the image to be formed based on the captured image information; and a determining a direction of the image to be formed based on the specific information so as to correspond to a top and bottom direction of the image to be formed based on the captured image information.

(27) A printing method, characterized in that, the printing method, for forming an image, based on captured image information and specific information, on the same image-forming medium, comprises the steps of:

detecting a background color of the image to be formed based on the captured image information; and a determining a background color of the image to be formed based on the specific information, corresponding to the background color detected in the detecting step.

(28) A printing method, characterized in that, the printing method, for forming an image, based on captured image information and specific information, on the same image-forming medium, comprises the steps of:

detecting a color of the image to be formed based on the captured image information and being located near the image based on the specific information; and a determining a background color of the image to be formed based on the specific information, corresponding to the color of the image detected in the detecting step.

(29) A image-forming medium, characterized in that, in the image-forming medium on which an image based on captured image information and specific information can be formed, at least a part of an area, at which the image based on the specific information is formed, can be separated from an area of the image based on the captured image information without using a cutting device.

According to the printing system of item 21, since the printing system, for forming an image, based on captured image information and specific information, on anyone of a plurality of image-forming media having different widths and a long-extension in a longitudinal direction in respect to an axial direction, comprises: a detector to detect a width of the image-forming medium, on which the image is formed; an obtaining device to obtain a size of the image to be formed; and a determining device to determine a layout of the image based on the captured image information and the image based on the specific information, based on the width detected by the detector and the size of the image obtained by the obtaining device, it becomes possible to effectively arrange the image based on the captured image information and the image based on the specific information within a limited space on the image-forming medium, and thereby, it is possible to suppress a using amount of the image-forming medium in a minimum level. Incidentally, although it is possible that the obtaining device obtains the size of the image to be formed, for instance, based on the information inputted by the operator in respect to the size, the scope of the obtaining mode is not limited to this example.

For instance, when the width of the image-forming medium detected by the detector is substantially equal to the image size, in a vertical or a lateral direction, obtained by the obtaining device, the determining device make the image size, in a vertical or a lateral direction, to be formed based on the captured image information coincide with the width of the image-forming medium, and the determining device determines at least one of a size, a shape and a forming position of the image so that the image to be formed based on the specific information aligns in a longitudinal direction of the image-forming medium, and thereby, it is no need to minimize the image to be formed based on the captured image information, even if the image-forming medium having the same width dimension as that of conventional one, and further, it becomes desirably possible to use the image-forming medium without any losses.

According to the printing system of item 22, since the printing system, for forming an image, based on captured image information and specific information, on the same image-forming medium, comprises: a detector to detect a top and bottom direction of the image to be formed based on the captured image information; and a determining device to determine a direction of the image to be formed based on the specific information so as to correspond to a top and bottom direction of the image to be formed based on the captured image information, for instance, when a customer views the image based on the captured image information, the customer can naturally recognize the image based on the specific information, the top and bottom direction of which coincides with that of image based on the captured image information. Thus, the appealing capability of images in regard to the specific information will be improved higher than ever.

Namely, when an image having top and bottom direction (for instance, such as a human face, etc) is included in the image to be formed based on the specific information, although it is desirable that the determining device determines the direction of the image so that the top and bottom direction of the image detected by the detector coincides with top and bottom direction of the image to be formed based on the specific information, it is not necessary to do so every time. This is because, sometimes, the appealing capability of the image would be increased by conversely arranging the top and bottom direction of the image.

Further, when one or a plurality of letters is/are included in the image to be formed based on the specific information, the viewer of the image can easily read the letters, since the determining device determines the direction of the image so that the top and bottom direction of the image detected by the detector coincides with the top and bottom direction of each letter.

Still further, in case that a row of letters is included in the image to be formed based on the specific information, the viewer of the image can easily read the letters, since the determining device arranges the leading edge of the row at the left end, when the letters are written vertically, while, the determining device arranges the leading edge of the row at the upper side, when the letters are written laterally.

According to the printing system of item 23, since the printing system, for forming an image, based on captured image information and specific information, on the same image-forming medium, comprises: a detector to detect a background color of the image to be formed based on the captured image information; and a determining device to determine a background color of the image to be formed based on the specific information, corresponding to the background color detected by the detector, it is possible to enforce an appealing capability of the image to be formed based on the specific information by appropriately determining the background color.

According to the printing system of item 24, since the printing system, for forming an image, based on captured image information and specific information, on the same image-forming medium, comprises: a detector to detect a color of the image to be formed based on the captured image information and being located near the image based on the specific information; and a determining device to determine a background color of the image to be formed based on the specific information, corresponding to the color of the image detected by the detector, it is possible to enforce an appealing capability of the image to be formed based on the specific information by appropriately determining the background color.

Desirably, when the background color, determined by the determining device, is selected as a complementary color of the color detected by the detector or a color having a completely different reflection spectrum, it is possible to strongly enforce an appealing capability of the image based on the specific information, while, when the background color, determined by the determining device, is similar to the color detected by the detector, for instance, a color having a similar reflection spectrum, the image based on the specific information would appeal to the viewer with a natural feeling.

According to the printing method of item 25, since the printing method, for forming an image, based on captured image information and specific information, on anyone of a plurality of image-forming media having different widths and a long-extension in a longitudinal direction in respect to an axial direction, comprises the step of: disposing the image based on the specific information at a position between images, based on the captured image information, aligned in the longitudinal direction of the image-forming medium, it becomes possible to effectively arrange the image based on the captured image information and the image based on the specific information within a limited space on the image-forming medium, and thereby, it is possible to suppress a using amount of the image-forming medium in a minimum level.

According to the printing method of item 26, since the printing method, for forming an image, based on captured image information and specific information, on the same image-forming medium, comprises the steps of: detecting a top and bottom direction of the image to be formed based on the captured image information; and a determining a direction of the image to be formed based on the specific information so as to correspond to a top and bottom direction of the image to be formed based on the captured image information, for instance, when a customer views the image based on the captured image information, the customer can naturally recognize the image based on the specific information, the top and bottom direction of which coincides with that of image based on the captured image information. Thus, the appealing capability of images in regard to the specific information will be improved higher than ever.

According to the printing method of item 27, since the printing method, for forming an image, based on captured image information and specific information, on the same image-forming medium, comprises the steps of: detecting a background color of the image to be formed based on the captured image information; and a determining a background color of the image to be formed based on the specific information, corresponding to the background color detected in the detecting step, it is possible to enforce an appealing capability of the image to be formed based on the specific information by appropriately determining the background color.

According to the printing method of item 28, since the printing method, for forming an image, based on captured image information and specific information, on the same image-forming medium, comprises the steps of: detecting a color of the image to be formed based on the captured image information and being located near the image based on the specific information; and a determining a background color of the image to be formed based on the specific information, corresponding to the color of the image detected in the detecting step, it is possible to enforce an appealing capability of the image to be formed based on the specific information by appropriately determining the background color.

According to the image-forming medium of item 29, since, in the image-forming medium on which an image based on captured image information and specific information can be formed, at least a part of an area, at which the image based on the specific information is formed, can be separated from an area of the image based on the captured image information without using a cutting device, for instance, when discount tickets or coupon tickets are formed as the image based on the specific information, it is conveniently possible for the customer to use them by easily cutting off only them from the photographic paper.

The term of "specific information", defined in the present invention, does not indicate the information for a lettering-print or a greeting card print, for which a customer designates an image layout and/or a row of letters in advance, but indicates fresh information and/or advertisements, which are initially viewed by the customer when he receives prints. Such the fresh information and/or advertisements include information suggested by the image or information in regard to the customer's interested item.

With respect to a detection of "top and bottom direction", it is possible to automatically determine based on the information included in the image, for instance, a human face, or it is also possible to determine based on information in respect to a top and bottom direction inputted by the operator, who views the image to determine its direction.

It is desirable that the term of "background color" indicates a color derived from an average density of a part other than the main subject, for instance, in respect to colors of mountains and the sky residing in the background of the human body. Further, when the main subject occupies almost of all area of the image, for instance, when taking a close-up photo of the human face, it is desirable that the "background color" is determined at a color derived by the abovementioned method in respect to all of the image information.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

[Embodiment 1]

Referring to EMBODIMENT 1, the present invention will be detailed in the following.

Figure 1:
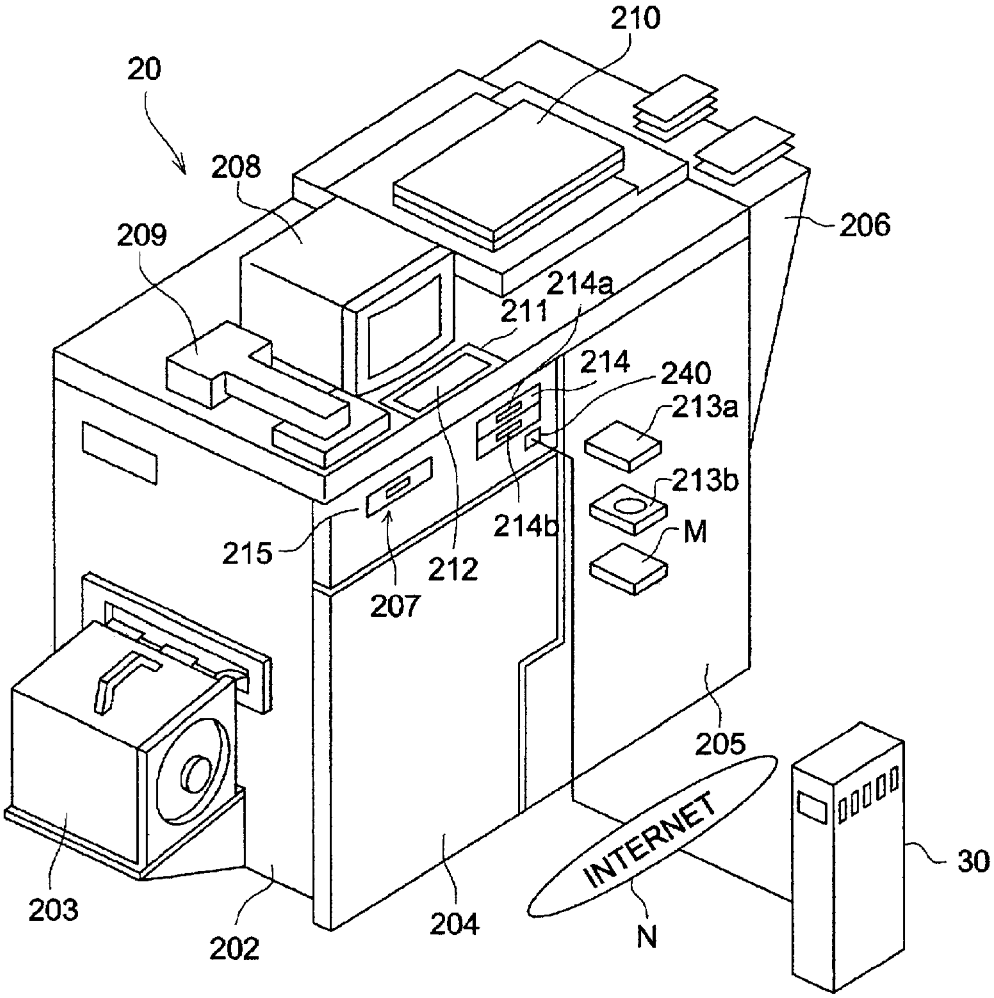
FIG. 1 shows a conceptual view of a print-outputting system embodied in the present invention.

FIG. 1 shows a conceptual view of a print-outputting system embodied in the present invention. In FIG. 1, print-outputting apparatus 20, serving as a printer having a function of a terminal device coupled to the network, and server 30 constitute the print-outputting system. Although print-outputting apparatus 20, which produces prints by exposing/developing images onto a photosensitive material and is desirably installed in the laboratories, etc., is exemplified in FIG. 1, it is also possible to employ other type of print-outputting apparatus, which can produce prints based on image information, such as, for instance, an ink-jet printer or an electro-photographic printer. Specifically, a print-outputting apparatus utilizing a roll-type image-forming medium is desirably employed.

Print-outputting apparatus 20, embodied in the present invention, incorporates magazine-loading section 203 mounted on the left side of main body 202. Exposure processing section 204 for exposing images on a roll-type photosensitive material (a photographic paper), serving as an image-forming medium, and development processing section 205 for producing the prints by developing the exposed photosensitive materials and drying them are provided in main body 202. The finished prints are delivered to delivery tray 206 mounted on the right side of main body 202. In addition, control section 207 is also incorporated in main body 202, and located at the upper portion of exposure processing section 204. Incidentally, magazine-loading section 203 capable of loading a plurality of photosensitive materials, widths of which are different relative to each other, can transmit a signal, corresponding to the type (width, size, etc.) of the roll-type photosensitive material currently loaded, to control section 207. Incidentally, control section 207 constitutes means for selecting and automatically extracting.

Further, CRT 208 is mounted on the top of main body 202 and constitutes a display means for displaying an image of prints to be produced based on image data. Film scanner section 209 which reads image data of a transparent original film, and reflection-type original image inputting apparatus 210 which reads image data of a reflective original sheet, are disposed at a left side and a right side of CRT 208, respectively.

The photosensitive materials, serving as a document, which can be read by film scanner section 209 and reflection-type original image inputting apparatus 210, includes a color negative film, a color reversal film, a black and white negative film, a black and white reversal film, etc., and image data captured by an analogue camera are memorized. Images recorded on the film can be converted to the image data by the film scanner of film scanner section 209. Further, images recorded on the color paper, being one of photosensitive materials, can be converted to the image data by the flat-bed scanner of reflection-type original image inputting apparatus 210.

Further, image-transferring section 214 is installed at a position of control section 207 in main body 202. Other than the aforementioned removable media M (PC card), IC card 213*a*, floppy disk 213*b*, etc. can be inserted into image-transferring section 214, which reads the image data, etc. from the recording medium currently inserted.

Operating section 211 is disposed in front of CRT 208, and information-inputting device 212, which comprises, for instance, a touch panel, etc., is arranged at operating section 211.

Further, memory-media writing section 215 is installed in main body 202, and writing device K (in FIG. 2), which writes the image data stored in memory-media onto magnetic memory media, optical memory media, etc., is further installed.

Concretely speaking, removable media, including a multimedia card, a memory stick, MD, CD-ROM, etc., can be cited as memory media for memorizing the image data. However, the memory media are not limited to the abovementioned removable media.

Incidentally, although operating section 211, CRT 208, film scanner section 209, reflection-type original image inputting apparatus 210, image-transferring section 214 and memory-media writing section 215 are integrally equipped with main body 202 to form an integrated apparatus in the abovementioned configuration, it is also applicable that one of them or more is/are provided separately from the integrated apparatus.

Figure 2:
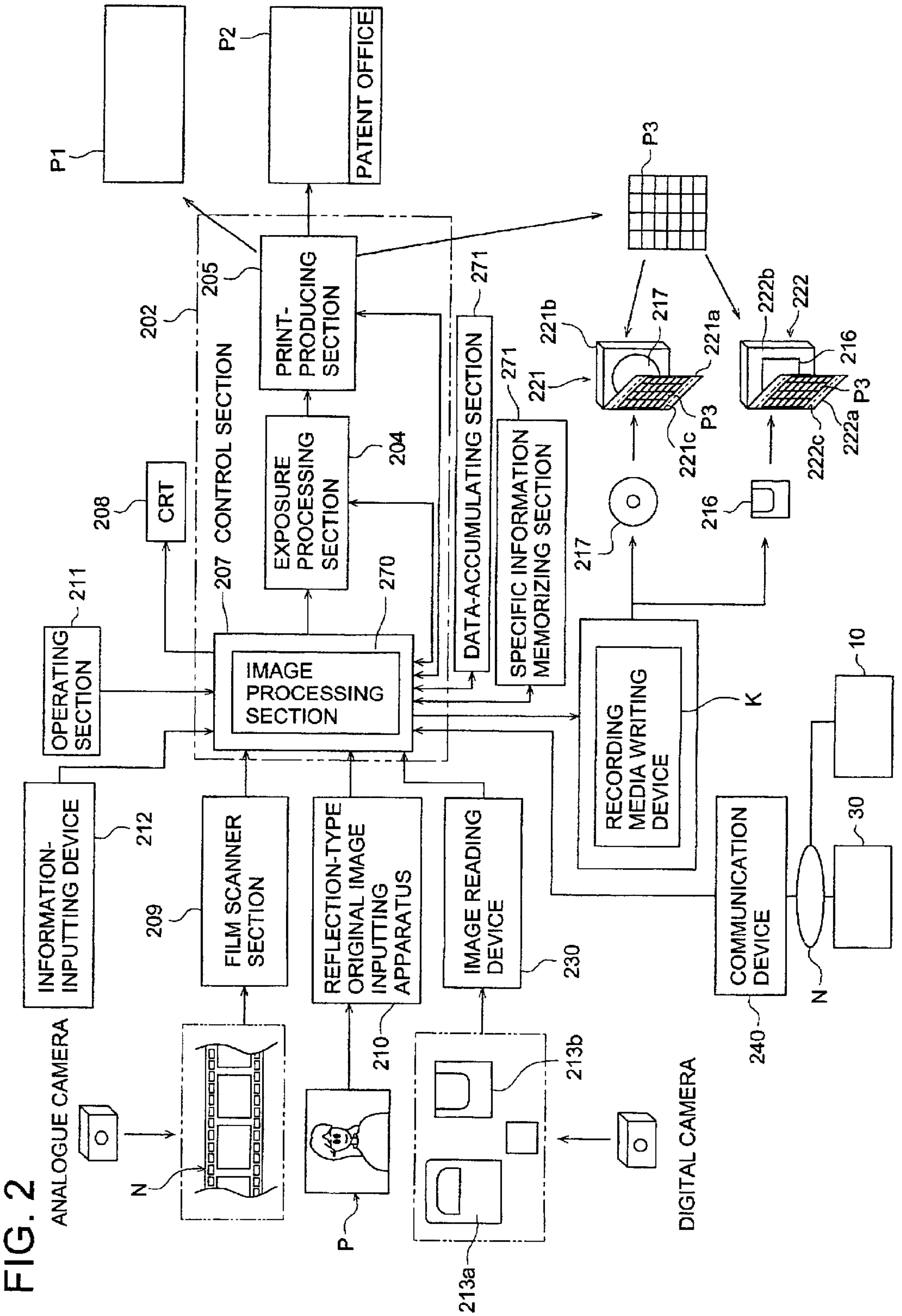
FIG. 2 shows a block-diagram of a configuration of a print-outputting apparatus.

FIG. 2 shows a block-diagram of a configuration of print-outputting apparatus 20.

Control section 207 of print-outputting apparatus 20 reads information of the document from film scanner section 209 and reflection-type original image inputting apparatus 210 based on command information sent from information-inputting device 212 to obtain image data, and displays on CRT 208.

Further, print-outputting apparatus 20 comprises data-accumulating section 271 and specific information memorizing section 272. The image data read from removable media M and print-order information (detailed later) corresponding to the image data can be stored and sequentially accumulated into data-accumulating section 271. Frame images of developed negative film N, obtained by developing a negative film on which images captured by an analogue camera are exposed, are inputted from film scanner section 209, and a frame image of print P, obtained by printing frame images onto photographic papers, is inputted from reflection-type original image inputting apparatus 210.

Specific information memorizing section 272 memorizes at least one of image data for setting a background image and a synthesizing region, and reads the specific information corresponding to the image data from server 30 to store it. One of specific information is selected from a plurality of specific information sets stored in specific information memorizing section 272 in a mode described later, and the image data are synthesized with the selected specific information to produce a print based on the synthesized image data. Although the specific information memorizing section is installed in print-outputting apparatus 20 in the above case, it is applicable that the specific information memorizing section is installed in another computer being independent from the print-outputting apparatus, while the synthesized image data is sent to the print-outputting apparatus to produce prints based on the synthesized image data.

As for a memorizing operation of the specific information, it is possible to read the specific information stored in server 30 from communication device 240 by accessing to server 30 through network N, such as the internet, etc., and it is also applicable that a plurality of specific information sets are downloaded into specific information memorizing section 272 in advance, or only desired specific information are downloaded to produce prints after the synthesizing operation at the time of printing.

Further, control section 207 comprises image processor 270, in which image data utilized for the exposing process are generated by processing the inputted image data, and are transmitted to exposure processing section 204 wherein the images are exposed on photosensitive materials. The exposed photosensitive materials are sent to print-producing section 205 to produce the prints through the processes of developing and then drying them.

Image reading device 230, for reading and transferring the image data stored in removable media M, and communication device 240, capable of communicating with server 30, are installed in image transferring section 214 of print-outputting apparatus 20. Image reading device 230 can reads the image data stored in removable media M currently inserted into image transferring section 214 and can transfer the image data to control section 207 including a microcomputer. On the other hand, communication device 240 can input the image data, etc. by communicating with server 30 through network N.

Figure 3:
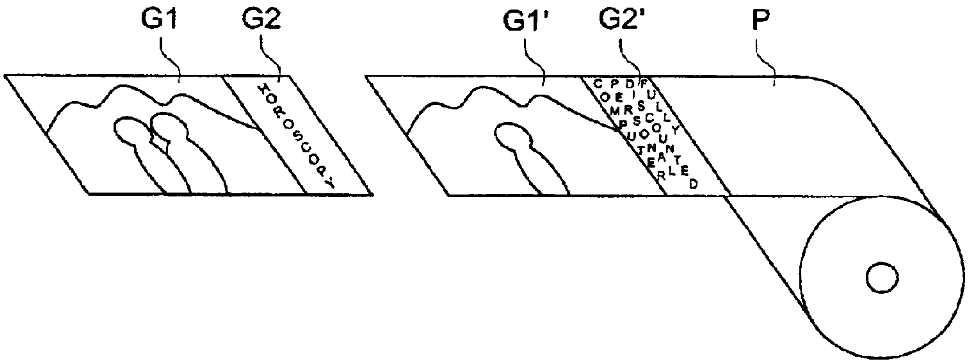
FIG. 3(*a*), FIG. 3(*b*), FIG. 3(*c*), FIG. 3(*d*) and FIG. 3(*e*) show explanatory illustrations for explaining printing operations of a print-outputting apparatus.
Figure 3:
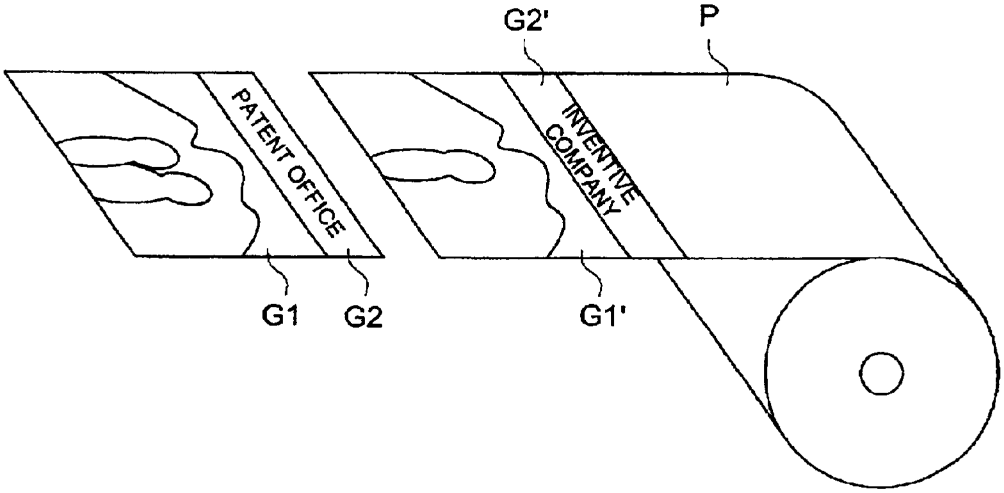
Figure 3:
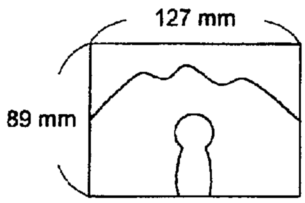
Figure 3:
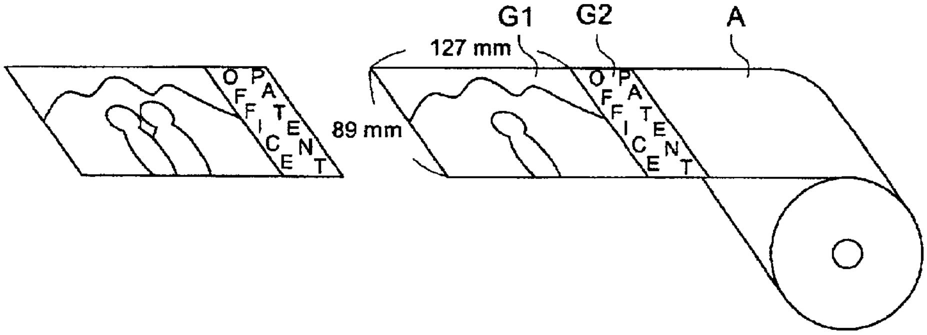
Figure 3:
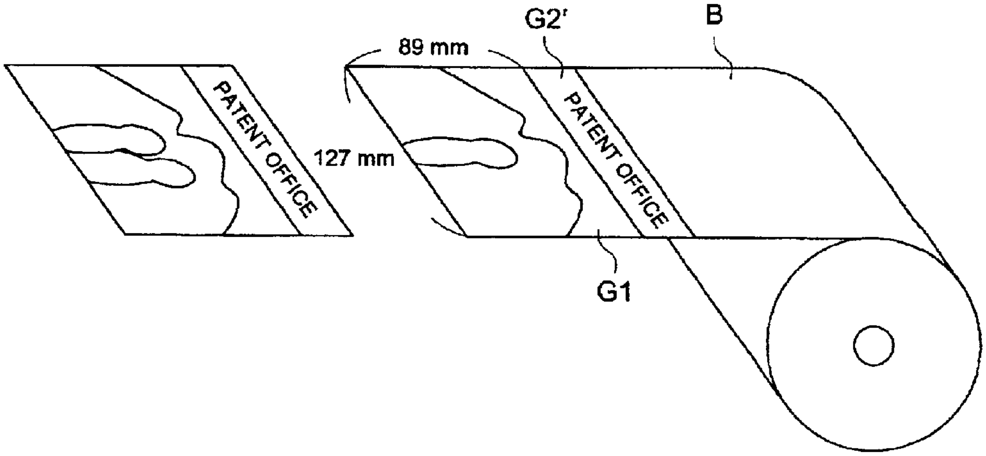

Next, referring to FIG. 3(*a*) and FIG. 3(*b*), printing operations of print-outputting apparatus 20, embodied in the present invention, will be detailed in the following. FIG. 3(*a*) and FIG. 3(*b*) show an explanatory illustration for explaining printing operations of print-outputting apparatus 20. Incidentally, print-outputting apparatus 20 can perform the following printing operations based on the program stored in the in-house hard-disk, serving as a memory medium.

Initially, it is assumed that a plurality of specific information sets are stored in server 30, in such a manner that each of specific information sets corresponds to its associate information in regard to its date and time and for identifying or classifying them. When the operator inputs reference information, including sex/age of the customer, etc., from information-inputting device 212, control section 207 (computer) of print-outputting apparatus 20 accesses server 30 through communication device 240 to automatically extract specific information, in which the customer may be interested, from specific information sets stored in server 30 based on the reference information inputted by the operator, and downloads the extracted specific information with the associate information.

Since the downloaded specific information sets are displayed on the screen of CRT 208, it is possible to select the suitable specific information to be attached to the prints based on the associate information. Incidentally, the associate information in regard to its date and time may be utilized as an indicator of information newness, and the associate information for identifying or classifying purpose can be utilized for selecting the information from the customer's favorite field. Accordingly, for instance, when the customer is a young lady, since it may be possible that she would be interested in a horoscopy or a like, the associate information with respect to the horoscopy of this week would be retrieved from server 30 to form image G2 located at a side area of image G1 on photographic paper P as shown in FIG. 3(*a*). Thus, it is possible to provide a print on which both image G1 and image G2 are printed.

On the other hand, for instance, when the customer is a young office worker, since it may be possible that he would be interested in an information-processing apparatus including a personal computer or a like, the associate information, with respect to a fully discounted personal computer, etc., would be retrieved from server 30 to form image G2' located at a side area of image G1' on photographic paper P as shown in FIG. 3(*a*). Thus, it is possible to provide a print on which both image G1' and image G2' are printed. Although the operator can perform the abovementioned selecting operation, it is desirable that control section 207 automatically conducts the selecting operation of this kind.

Accordingly, to select the specific kind of information corresponding to the customer's taste, it is desirable that information of the customer, including sex, age, interests, etc., are investigated and stored in advance by hearing from the customer, so as to reflect such information onto the operation for selecting the specific kind of information to be recorded on the prints. Further, it is also possible that information, in respect to the kind of images captured by the customer, are accumulated in advance, so as to reflect such information onto the operation for selecting the specific kind of information to be recorded on the prints.

Further, in a mode that each of laboratories accesses an information-storing site provided in server 30 by the dealer, it is possible for the laboratories to automatically obtain a lot of information without making efforts for collecting information by themselves. It is desirable that the information-providing dealer revises the information stored in server 30 at every predetermined period of time so that each of laboratories can record the newest daily information onto the prints by accessing the information-storing site provided server 30 every day to store the information in print-outputting apparatus 20.

Further, as a modified example of the EMBODIMENT 1, it may be applicable that advertising information sets, serving as a plurality of specific information sets, are stored in specific information memorizing section 272 in such a manner that the priority degree or the order of each of the advertising information sets is determined in advance. In this case, since the advertising information is recorded on the prints according to its priority degree or its order, it is possible to record the information on the prints in the favorite order. It is also applicable that the advertising information sets, to each of which the abovementioned priority degree or the order is already attached, are stored in server 30 in advance. In this case, it is possible to read them through network N. Alternatively, it is also applicable that only the advertising information sets are stored in server 30 in advance, and the abovementioned priority degree is attached after the advertising information is read into print-outputting apparatus 20 from server 30.

Figure 4:
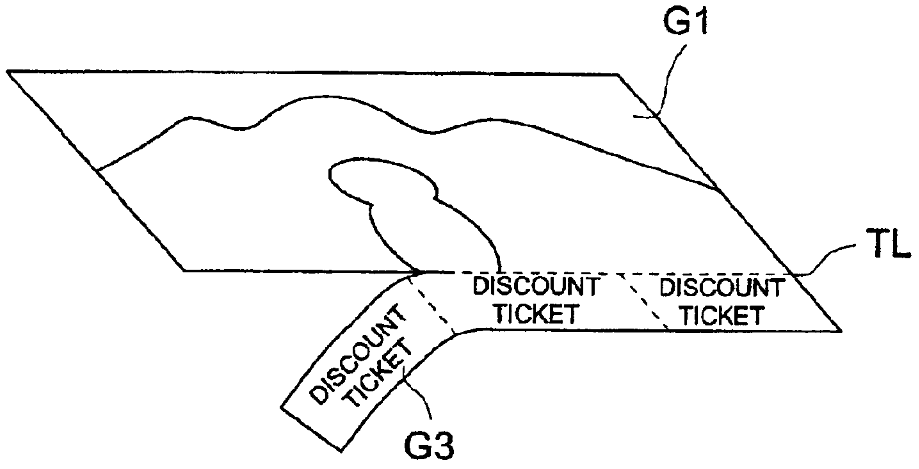
FIG. 4 shows a perspective view of a photographic paper, being an example of image forming media printed by a print-outputting apparatus.

According to the modified example mentioned above, when a customer orders a plurality of prints, it is possible to record different advertising information sets onto the consecutive prints, for instance, advertisement G2 of "PATENT OFFICE" is attached to image G1 of the first print, while advertisement G2' of "INVENTIVE COMPANY" is attached to image G1' of the second print, as shown in FIG. 3(*b*). Therefore, it is possible to improve the advertising effect according as the priority degree. Incidentally, as shown in FIG. 4, it is also applicable that each of the prints is perforated at a line between image G1 and specific information G3 to cut them each other.

Incidentally, when determining the priority degree or the order, although it is applicable that the operator manually inputs the priority degree, etc., it is also possible that the priority degrees, etc. are automatically determined, for instance, corresponding to fluctuation in advertising fees, by performing a predetermined program in the computer. When a number of advertisements is excessively large, however, sometimes it may be impossible to determine the priority degree. In this case, it is applicable that a plurality of specific information sets, such as advertisements, etc., are stored in specific information memorizing section 272 (computer) in advance, and advertising information sets, being different each other, are recorded onto the consecutive prints, on which captured images are also recorded, by randomly extracting an arbitral advertisement, irrespective of the priority and the images captured by the customer, based on random numbers generated by specific information memorizing section 272.

Although the present invention has been described in reference to EMBODIMENT 1 in the above, the scope of the present invention is not limited to that of EMBODIMENT 1. Needless to say that disclosed EMBODIMENT 1 can be varied by a skilled person without departing from the spirit and scope of the present invention.

According to EMBODIMENT 1, it becomes possible to provide a printing system, a printing method and an image-forming apparatus, which make it possible to efficiently utilize an image-forming medium and to form an image having a high appealing capability.

[Embodiment 2]

Next, EMBODIMENT 2 of the present invention will be detailed in the following. However, the description duplicating with that of EMBODIMENT 1 will be omitted for simplicity.

In EMBODIMENT 2, at least one of specific information image data, for setting a background image and a synthesizing region, and data, having a number corresponding to said specific information image data, are stored in specific information memorizing section 272 in advance. The predetermined specific information image data set is specified from a plurality of specific information image data sets, stored in advance in specific information memorizing section 272, by the operating actions of the operator or based on the number of the specific information image data set included in the print-order information. Then, the image data are generated by synthesizing the specific information image data selected, and the prints are produced based on the synthesized image data.

As for the memorizing operation of the specific information image data, it is applicable that a plurality of specific information image data sets are downloaded into the specific information memorizing section in advance by accessing server 30, in which specific information image data sets are stored, through communication device 240, or it is also applicable that, when printing, only desirable specific information image data sets are downloaded to produce prints after the synthesizing operation of them.

In control section 207, top and bottom information and background color information, in respect to the image data obtained from information-inputting device 212, are detected, and a layout and color of specific information image data is determined based on the detected information to produce the synthesized prints.

Further, control section 207 comprises image processor 270, in which image data utilized for the exposing process are generated by processing the inputted image data, and are transmitted to exposure processing section 204 wherein the images are exposed on photosensitive materials. The exposed photosensitive materials are sent to print-producing section 205 to produce the prints through the processes of developing and then drying them.

Image reading device 230, for reading and transferring the image data stored in removable media M, and communication device 240, capable of communicating with print-receipt device 10, are installed in image transferring section 214 of print-outputting apparatus 20. Image reading device 230 can reads the image data stored in removable media M currently inserted into image transferring section 214 and can transfer the image data to control section 207 including a micro-computer. On the other hand, communication device 240 can input the image data, etc. by communicating with print-receipt device 10 through internet NT.

Print-outputting apparatus 20 can conducts normal printing operation P1, specific information printing operation P2 and index printing operation P3 based on the image data stored in removable media M and the print-order information stored corresponding to the image data.

Next, referring to FIG. 3(*c*), FIG. 3(*d*) and FIG. 3(*e*), printing operations of print-outputting apparatus 20 of EMBODIMENT 2 will be detailed in the following. FIG. 3(*c*), FIG. 3(*d*) and FIG. 3(*e*) show an explanatory illustration for explaining printing operations of print-outputting apparatus 20. Incidentally, print-outputting apparatus 20 can perform the following printing operations based on the program stored in the in-house hard-disk, serving as a memory medium.

At first, the L print size is exemplified in the following explanation. Generally speaking, as shown in FIG. 3(*c*), the vertical and horizontal dimensions of the L print size are 89 mm and 127 mm, respectively. The abovementioned dimensions include border margins when employing bordered prints. Incidentally, it is assumed that the prints, on which advertising images, etc. are printed based on the specific information, in respect to the normal captured images, are produced in EMBODIMENT 2.

In the above case, when the image size based on the specific information is set at arbitral dimensions, the photographic paper should be changed according with the change of the dimensions. However, since the photosensitive material, which can be loaded into print-outputting apparatus 20, is longer in the longitudinal direction than the length of its width direction, the roll-type photosensitive material is accommodated. Incidentally, the roll-type photosensitive materials, having the width dimension of either 89 mm or 127 mm, have been generally employed for this application. Therefore, it has been a problem that employing photosensitive materials having other sizes considerably increase cost.

Accordingly, for instance, in case that photosensitive material A having a width dimension of 89 mm is loaded in print-outputting apparatus 20 of EMBODIMENT 2, when control section 207, serving both as a detecting device, an obtaining device and a determining device, detects the width of the loaded photosensitive material and also detects the print size (in this case, the L print size) from the inputted print-order information, control section 207 forms image G1 on photosensitive material A based on the captured image information in such a manner that the vertical dimension of image G1 fully occupies the width dimension of photosensitive material A, as shown in FIG. 3(*d*), and then, successively forms image G2 based on the specific information in the longitudinal direction of photosensitive material A. Therefore, it becomes possible to effectively utilize almost all of photosensitive material A of the roll-type without generating cutting-out portions to be abandoned for forming image G2. Incidentally, although it is desirable that the vertical length of image G2, based on the specific information, coincides with the vertical dimension of image G1 to maintain conformity of both dimensions, it is possible to arbitrarily determine the lateral length of image G2 irrespective to the size of image G1.

On the contrary, in case that photosensitive material B having a width dimension of 127 mm is loaded in print-outputting apparatus 20 of EMBODIMENT 2, control section 207 forms image G1 on photosensitive material B based on the captured image information in such a manner that the lateral dimension of image G1 fully occupies the width dimension of photosensitive material B, as shown in FIG. 3(*e*), and then, successively forms image G2' based on the specific information in the longitudinal direction of photosensitive material B. Therefore, it becomes possible to effectively utilize almost all of photosensitive material B of the roll-type without generating cutting-out portions to be abandoned for forming image G2'. Incidentally, although it is desirable that the lateral length of image G2', based on the specific information, coincides with the lateral dimension of image G1 to maintain conformity of both dimensions, it is possible to arbitrarily determine the vertical length of image G2' irrespective to the size of image G1.

In the abovementioned example, although image G2 or G2' is formed in successive to image G1 in respect to the pulling-out direction of roll-type photosensitive material A or B, it is also possible to reversely arrange them.

Incidentally, advertising images, etc., based on the specific information, sometimes include images having top and bottom direction, such as a human face, a letter, etc. When randomly forming those images, there is a fear that an unnatural image would be formed due to a lack of conformity with image G1, based on the captured image information, in its top and bottom direction.

On the other hand, when capturing images with a camera, it is possible that the camera reads and inputs the top and bottom information of each image, and it is also possible that the operator inputs the top and bottom direction by viewing the image. When such the top and bottom information are inputted, control section 207, serving both as a detecting device and determining device, determines the direction of image G2 or G2', to be formed based on the specific information, so that the direction of image G2 or G2' corresponds to the direction of image G1 to be formed based on the captured image information. Therefore, when the customer views image G1 formed on the provided print, the customer can naturally recognize image G2 or G2', since the top and bottom direction of image G2 or G2' coincides with that of image G1. Thus, the appealing capability of images in regard to advertisement, etc. will be improved.

Concretely speaking, when the image based on the specific information includes letters of "PATENT OFFICE", it is necessary that the top and bottom direction of each letter and the arrangement of letters should coincide with those of image G1. Accordingly, in the sate shown in FIG. 3(*d*), the letters of "PATENT OFFICE" should be written vertically, while in the sate shown in FIG. 3(*e*), the letters of "PATENT OFFICE" should be written laterally. For this purpose, control section 207 performs such an image-processing that each letter is rotated at 90° in a right direction and the gap between adjacent letters is appropriately widened.

Incidentally, it is desirable that control section 207 has a function of recognizing a leading edge of row of letters. This is because, when the letters are written vertically, it is possible to arrange the leading edge of the row at the left end, while, when the letters are written laterally, it is possible to arrange the leading edge of the row at the upper side. Thus, the viewer of the prints can easily read the row of letters.

Further, control section 207, serving both as a detecting device and a determining device, can enforce an appealing capability of the image to be formed based on the specific information by detecting the background color of the image to be formed based on the captured image information and by appropriately determining the background color of the image to be formed based on the specific information, corresponding to the detected background color. Namely, when the background color of the specific image is selected as a complementary color (for instance, an orange color) of the background color (for instance, an green color) of the captured image, it is possible to strongly stress the contrast between the captured image and the specific image, while, when the background color of the specific image is similar to the background color of the captured image, it is possible to display the specific image with a natural feeling.

As well as the above, control section 207, serving both as a detecting device and a determining device, can enforce an appealing capability of the image to be formed based on the specific information by detecting the color of the image, to be formed based on the captured image information and located near the image to be formed based on the specific information, and by appropriately determining the background color of the image to be formed based on the specific information, corresponding to the detected color.

FIG. 4 shows a perspective view of a photographic paper, being an example of image forming media printed by print-outputting apparatus 20. As shown in FIG. 4, both image G1 to be formed based on the captured image information and image G3 to be formed based on the specific image information are printed on photographic paper P. In this application, image G3 can be used for discount tickets. It is difficult, however, to cut off a portion of image G3 without using a cutting device such as a pair of scissors, etc., since the photographic paper is made of a comparatively thick paper.

Accordingly, in EMBODIMENT 2 of the present invention, perforated line TL is formed between image G1 and image G3 so that at least a part of the area, on which image G3 is formed based on the specific information, can be separated from the area, on which image G1 is formed based on the captured image information, without using a cutting device. Therefore, it is conveniently possible for the customer to use discount tickets (or coupon tickets, etc.) by easily cutting off only them from the photographic paper by hand. Incidentally, the method for cutting off the portion of image G3 is not limited to the perforated line mentioned above. It is also applicable that image G3 is formed on a seal, which can be easily peeled off, and the customer peel off the seal when using it.

Although the present invention has been described in reference to EMBODIMENT 2 in the above, the scope of the present invention is not limited to that of EMBODIMENT 2. Needless to say that disclosed EMBODIMENT 2 can be varied by a skilled person without departing from the spirit and scope of the present invention.

According to EMBODIMENT 2, it becomes possible to provide a printing system, a printing method and an image-forming apparatus, which make it possible to efficiently utilize an image-forming medium and to form an image having a high appealing capability.

[Embodiment 3]

Next, with regard to EMBODIMENT 1, the method for reducing the payment of the customer will be detailed in the following.

Figure 5:
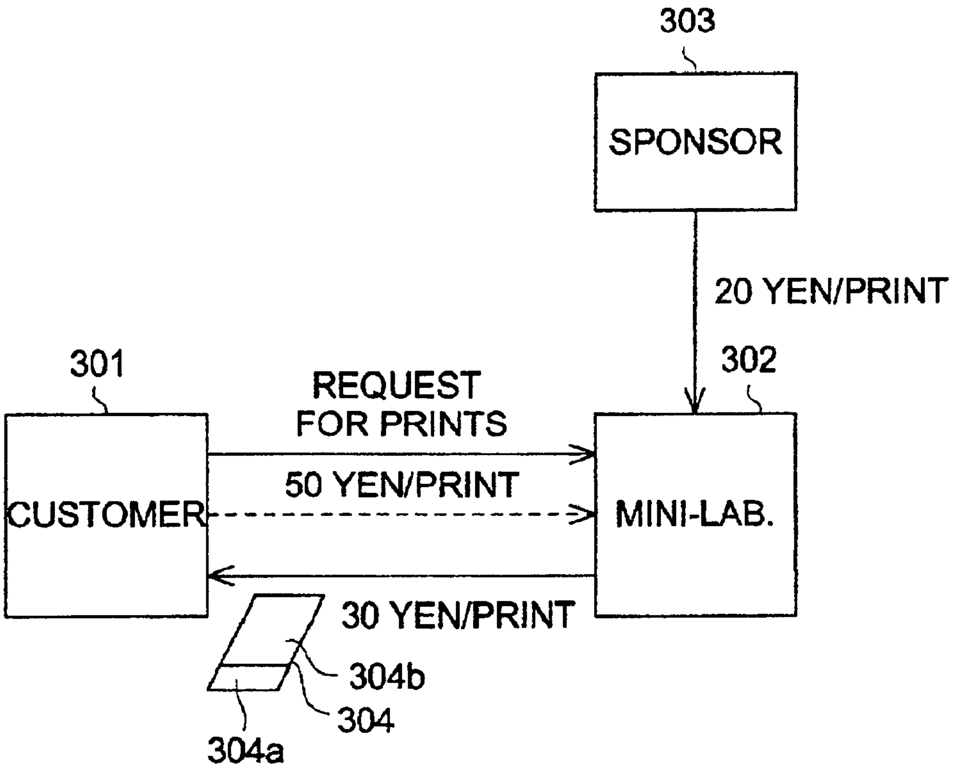
FIG. 5 shows a conceptual block-diagram of EMBODIMENT 3.

FIG. 5 shows a conceptual block-diagram of EMBODIMENT 3. In FIG. 5, numeral 301 indicates a customer who orders prints, numeral 302 indicates a mini-lab., which produces the prints, and numeral 303 indicates a sponsor of advertisement. It is assumed that, for instance, sponsor 303 should pay 20 yen per one print to mini-lab. 302 for a cost of printing advertising images onto every prints in advance. In EMBODIMENT 3, mini-lab. 302 constitutes the print-service system.

As a result of the abovementioned assumption, mini-lab. 302 directly delivers or sends the prints with the advertising images to customer 301 in response to the print order issued by customer 301. In print 304 of EMBODIMENT 3, numeral 304*a* indicates an advertising region and numeral 304*b* indicates an image region. Since customer 301 receives the prints on which advertising images are printed, the sponsor's payment for the advertising images reduces the cost of the prints to, for instance, 30 yen per one print (shown by the solid line in FIG. 5), which is cheaper than the normal price of 50 yen per one print without the advertising image (shown by the broken line in FIG. 5). Namely, it is possible for mini-lab 302 to reduce the price of the print-service for customer 301 from normal price of 50 yen per one print to 30 yen per one print, since the cost of 20 yen per one print for printing the advertisement can be charged to sponsor 303. Therefore, it becomes possible to reduce the price of the print-service for the customer, to the extent that the advertising images are printed.

Figure 6:
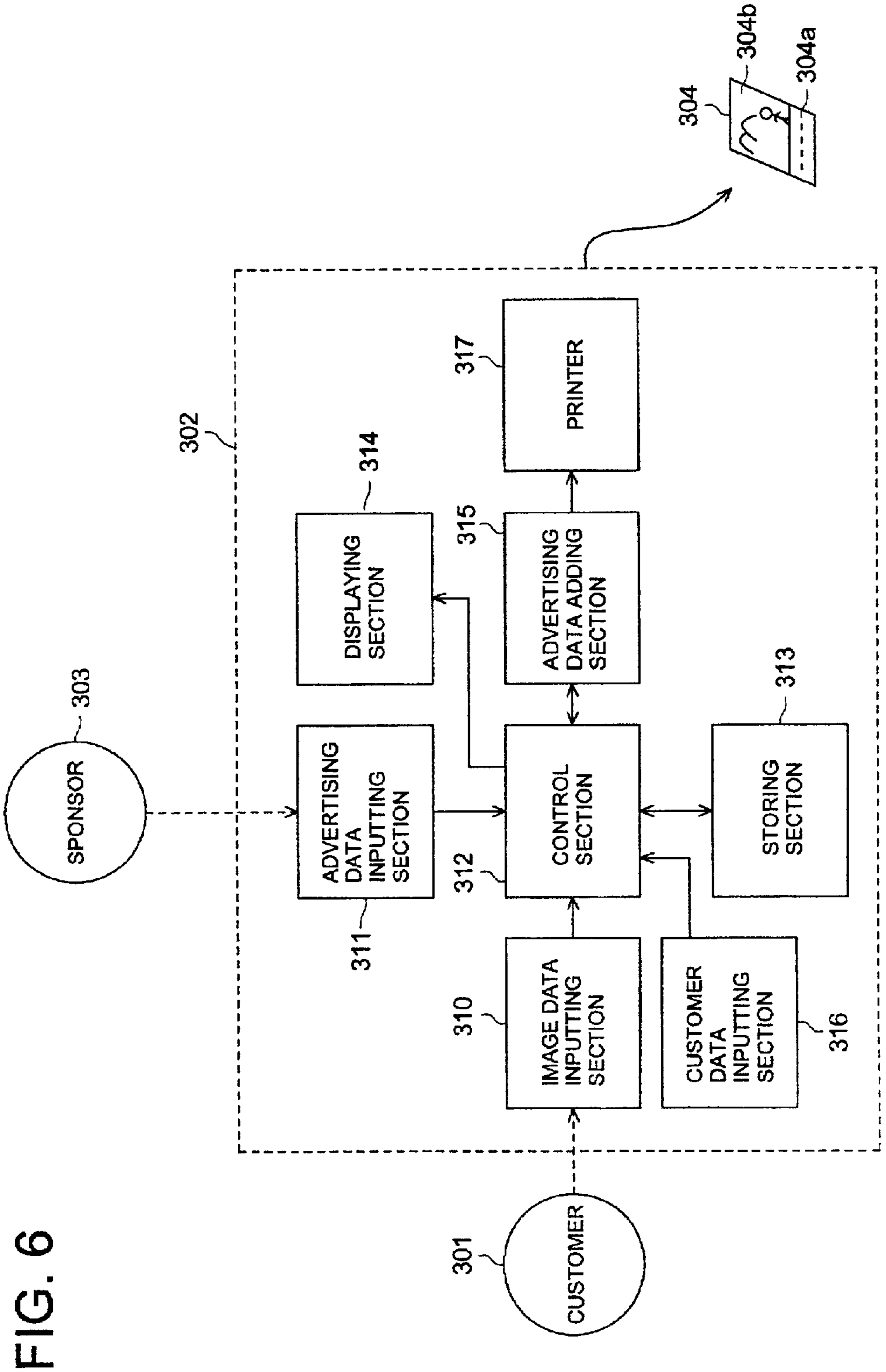
FIG. 6 shows a block diagram of a configuration of a mini-lab (a print-service system)

FIG. 6 shows a block diagram of a configuration of a mini-lab (a print-service system). In FIG. 6, the same reference number indicates the same block as that in FIG. 5. Numeral 310 indicates an image data inputting section to input image data given by customer 301, and numeral 311 indicates an advertising data inputting section to input advertising data given by sponsor 303. Numeral 312 indicates a control section to conduct controlling actions for storing data, received from image data inputting section 310 and/or advertising data inputting section 311, into storing section 313 and to conduct other kinds of controlling actions.

Numeral 313 indicates a storing section, coupled to control section 312, to store the image data and other kinds of data, and numeral 314 indicates a displaying section, coupled to control section 312, to display various kinds of information. Numeral 315 indicates an advertising data adding section to add the advertising data, inputted from advertising data inputting section 311, to the image data inputted from image data inputting section 310. Numeral 316 indicates a customer data inputting section to input customer data (such as name, address, sex, etc.) and to feed them to control section 312. Numeral 317 indicates a printer to produce prints with the advertising images. Printer 317 outputs print 304 on which an advertising image is added.

Numeral 304*a* indicates an advertising region of print 304, and, for instance, an advertising message of "Konica Camera Shop" is printed onto advertising region 304*a*. Numeral 304*b* indicates an image region in which an image captured by customer 301 is printed. Image data inputting section 310, advertising data inputting section 311, control section 312, storing section 313, displaying section 314, advertising data adding section 315 and printer 317, described in the above, are equipped in mini-lab 302. The operations of the system, having the abovementioned configuration, will be detailed in the following.

In EMBODIMENT 3, it is assumed that a contract in respect to the photographic advertisement has been concluded between sponsor 303 and mini-lab 302. In the contract, for instance, kinds of advertisements, an advertising period of time, a cost for the advertising service, etc. are determined, and the contents of the advertisement are also determined corresponding to customer's data, such as name, address, sex, etc. Sponsor 303 can change the contents of the advertisement corresponding to the age, the residential area (address), sex, etc. of customer 301. The contents of the contract, determined by the abovementioned procedure, are stored in storing section 313 in advance, and sponsor 303 should pay the advertising fee in accordance with the contents of the contract.

Next, advertising data having contents contracted with sponsor 303 are inputted into mini-lab 302 from advertising data inputting section 311. At this time, the advertising data are not limited to a single kind of advertisement, but plural kinds of advertisement would be acceptable. Control section 312 stores the advertising data, inputted into mini-lab 302, in storing section 313.

Next, image data sent from customer 301 are inputted into mini-lab 302 from image data inputting section 310 and fed to control section 312, which temporarily stores the image data, inputted into mini-lab 302, in storing section 313. Then, control section 312 displays a menu Table for corresponding the image with the advertisement on the screen of displaying section 314, on which the advertising data in accordance with the contents of the contract are displayed.

Corresponding to the demand of customer 301, the operator selects a suitable advertisement out of a plurality of advertisements by clicking the mouse (not shown in the drawings). Then, control section 312 identifies the advertising data selected by the operator.

Control section 312 sequentially reads the image data of customer 301 stored in storing section 313 and outputs the image data to advertising data adding section 315. On the other hand, control section 312 also reads the advertising data stored in storing section 313 and outputs the advertising data to advertising data adding section 315. In advertising data adding section 315, an image-processing operation, for adding the advertising data to the image data inputted from control section 312, is conducted. The image-processing operation can be conducted by using the conventional image-processing technologies.

The image data added with the advertising data, created in advertising data adding section 315, is inputted into printer 317 to deliver print 304. As shown in the drawing, the advertising message of "Konica Camera Shop" is printed on advertising region 304*a*, while the image captured by customer 301 is printed on image region 304*b*. Customer 301 receives the print 304 via mail or by paying a visit to mini-lab 302, and pays a print-service fee corresponding to the received prints to mini-lab 302. Other than the cash payment, the payment of this fee would be also achieved by using an electronic money system in which the bill is automatically charged to the bank account of customer 301.

As described in the above, according to EMBODIMENT 3, it becomes possible to produce prints having an advertisement in the printed image.

In EMBODIMENT 3, control section 312 has a function of controlling a number of prints, namely, a number of prints is stored into storing section 313 by control section 312 at every time of the print producing operation. Then, control section 312 requests sponsor 303 to pay the advertising fee corresponding to the number of prints. Concretely speaking, it is possible to send a bill printed by printer 317 to sponsor 303, or it is also possible to display the advertising fee on displaying section 314 so that sponsor 303 recognizes a sum of the advertising fee by viewing the contents displayed on the screen. Accordingly, it becomes possible to receive the advertising fee corresponding to the number of prints from sponsor 303.

Figure 7:
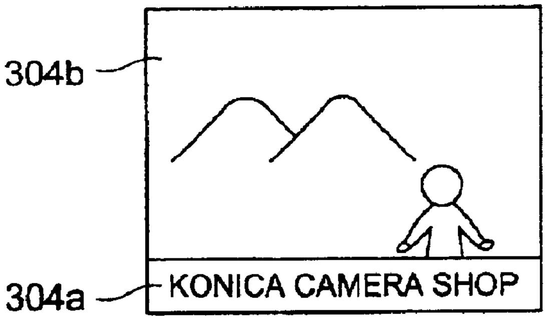
FIG. 7(*a*) and FIG. 7(*b*) show printing formats of a print.
Figure 7:
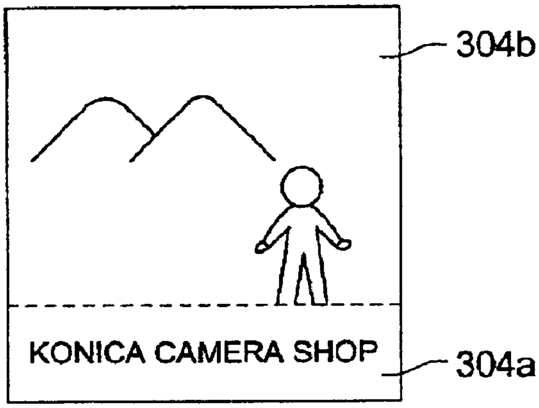

FIG. 7(*a*) and FIG. 7(*b*) show printing formats of the print. FIG. 7(*a*) shows a first printing format, in which the advertisement is overlapped with the captured image within the standard image size. FIG. 7(*b*) shows a second printing format, in which the advertisement is printed on an area outside the standard image size without overlapping with the captured image. In the first printing format, since advertising region 304*a* is included in the area of the standard image size, a part of the captured image are erased, while, in the second printing format, since the advertisement is printed on the area outside image region 304*b* without overlapping with the captured image, the full size of the captured image can be printed on the photographic paper without erasing a part of the captured image.

It is possible to restore the size of the second printing format to the standard image size by cutting off advertising region 304*a*, if needed. According to EMBODIMENT 3, it is possible to print an advertisement on the standard image size, and, when the size is larger than the standard image size, it is also possible to restore the size of the second printing format to the standard image size by cutting off a portion of advertisement.

Figure 8:
FIG. 8 shows an exemplified table displayed on the screen of a displaying section at the time of the print-order.

According to EMBODIMENT 3, it is possible to display information, which designate contents of advertisement, and a discount rate of the print for each of the information at the time of the print-order. FIG. 8 shows an exemplified table displayed on the screen of displaying section 314 at the time of the print-order. In the table, contents of advertisement are displayed corresponding to each discount rate. For instance, as for the advertisement indicated in column A, the discount rate is set at 10 yen per one print.

Further, as for the contents of the advertisement, it is possible to display not only a row of letters as shown in columns A, B of the table, but also an image, such as a flower, etc., with letter information as shown in column C. As a result, it becomes possible to notify the customer of the contents of the advertisement as well as the discount rate in advance.

Still further, according to EMBODIMENT 3, control section 312 can change the contents of the advertisement corresponding to the customer's information. For instance, when sponsor 303 runs an electronic-appliance shop, people living near the electronic-appliance shop are expected to be customers who buy products sold by the electronic-appliance shop. In such the case, when one of customers for the electronic-appliance shop orders prints to mini-lab 302, it is possible to print the advertisement of the electronic-appliance shop on the prints provided for the customer. Namely, control section 312 searches out the residential area of the customer based on the address information of the customers so as to print the advertisement of the electronic-appliance shop stored in storing section 313. Then, the advertising data of the electronic-appliance shop are added to the image data of the customer in advertising data adding section 315. As a result, printer 317 delivers print 304 on which the advertisement of the electronic-appliance shop is printed.

Incidentally, data of age, sex, etc. are also employed as the customer's information. In addition, when the customer is female, it is possible to print the advertisement of cosmetics.

Figure 9:
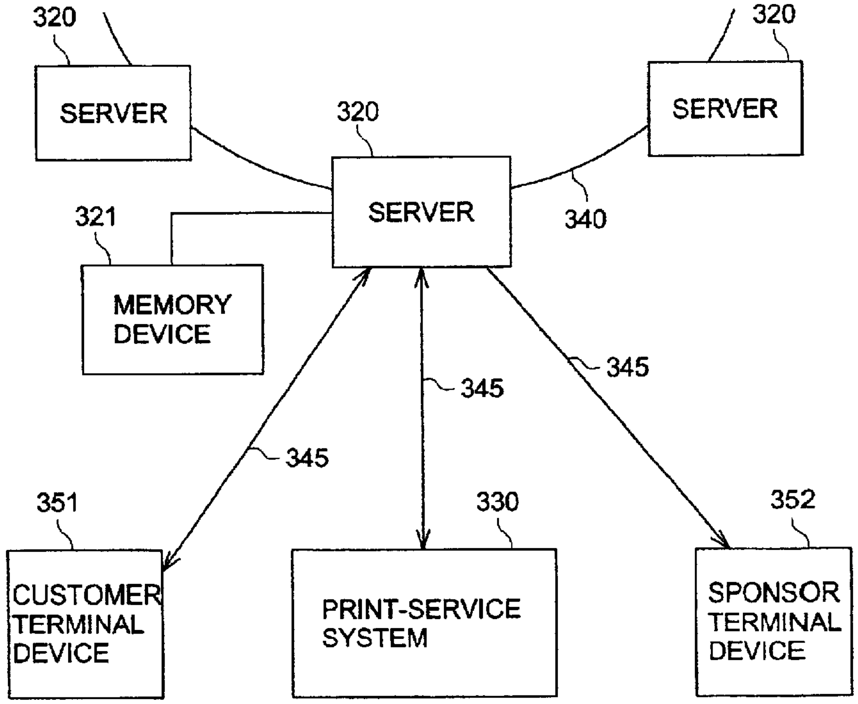
FIG. 9 shows a block diagram of a network system, being another example of EMBODIMENT 3.

Although the operations of EMBODIMENT 3 shown in FIG. 5 have been described in the above, EMBODIMENT 3 is also applicable for a network system. FIG. 9 shows a block diagram of a network system, being another example of EMBODIMENT 3. Although the Internet is exemplified as the network system shown in FIG. 9, the scope of the network system is not limited to the Internet. Needless to say that other type of network also can be employed. In FIG. 9, numeral 320 indicates a server, and a plurality of servers are coupled relative to each other through communication line 340. For instance, a Web server is employed for server 320. Numeral 321 indicates a memory device, coupled to server 320, for memorizing image data of advertising designs requested by the sponsor and corresponding data for discounting the price.

Numeral 351 indicates a customer terminal device, which is coupled to server 320 through communication line 340. Numeral 330 indicates a print-service system, which is installed in the mini-lab, etc. as shown in FIG. 6 and also coupled to server 320 through communication line 340. Numeral 352 indicates a sponsor terminal device, which is also coupled to server 320 through communication line 340. Although customer terminal device 351, print-service system 330 and sponsor terminal device 352 are coupled to the same server in the exemplified system shown in FIG. 9, the scope of the present invention is not limited to the above example. It is also applicable that each of them is independently coupled to server 320, being different relative to each other. In the system shown in FIG. 9, TCP/IP (a communication protocol for Internet) is employed for conducting communication between the blocks relative to each other. The operations of the abovementioned system will be detailed in the following.

Sponsor terminal device 352 transmits image data of advertising designs and corresponding data for discounting the price by accessing server 320. In server 320, the image data of advertising designs and corresponding data for discounting the price, transmitted from sponsor terminal device 352, are stored in memory device 321.

After the image data of advertising designs and corresponding data for discounting the price are stored in memory device 321, customer terminal device 351 can recognize the image data of advertising designs the price by accessing server 320.

The customer, who already confirms the contents of advertisement of the sponsor and the discount rate, accesses server 320 to order prints. Next, the customer designates the advertising data to be printed on the prints from customer terminal device 351, and then, transmits the image data to server 320.

Server 320 transmits the image data and the advertising data to be printed on the prints to print-service system 330. In print-service system 330, the advertising data is added to the image data to produce the prints. The finished photographic prints are sent to the customer from the site of print-service system 330, for instance, via mail. The customer, who receives the photographic prints sent via mail, pays the printing fee to the site of print-service system 330 corresponding to the contents of the bill enclosed with the prints. The methods of paying the printing fee to the site of print-service system 330 may include such methods as paying by cash, paying into the bank account, being charged to the customer's bank account, etc.

Although the mini-lab. is exemplified as the print-service system in the abovementioned embodiment, the scope of the present invention is not limited to the mini-lab. For instance, a large-sized laboratory is also applicable for the print-service system mentioned above.

Disclosed embodiment can be varied by a skilled person without departing from the spirit and scope of the invention.

What is claimed is:

1. A method for producing a print on which both a visible image of image data based on an image captured by a customer and specific information are printed, comprising the steps of:

extracting the specific information from a memory section in which a plurality of specific information are stored, irrespective of the image captured by the customer;

printing the specific information onto a part of the print based on the extracted specific information; and printing the visible image onto the print, wherein a plurality of the specific information are stored in the memory section in such a manner that a predetermined degree of priority is determined in advance, and the extracted specific information is extracted according to the degree of priority.

2. The method for producing a print as defined by claim 1, further comprising the step of providing the memory section in a server installed on a network.

3. The method for producing a print as defined by claim 1, wherein the specific information is printed as a visible image onto the print.

4. The method for producing a print as defined by claim 1, wherein the degree of priority corresponds to the customer's information which is accumulated in advance.

5. The method for producing a print as defined by claim 1, wherein the degree of priority is determined according to fluctuations in advertising fees.

* * * * *